(12) United States Patent
Sagar

(10) Patent No.: US 6,560,559 B2
(45) Date of Patent: May 6, 2003

(54) SYSTEM AND METHOD FOR DETECTING AND CORRECTING INCORRECT HAND POSITION OF A COMPUTER USER

(75) Inventor: Richard Bryan Sagar, Santa Clara, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/932,074

(22) Filed: Aug. 17, 2001

(65) Prior Publication Data

US 2003/0036879 A1 Feb. 20, 2003

(51) Int. Cl.⁷ .............................................. G06F 15/00
(52) U.S. Cl. ........................................ 702/150; 704/10
(58) Field of Search ........................... 702/150; 704/10, 704/9; 341/22; 400/472, 61, 477, 480; 345/104; 340/407.1

(56) References Cited

U.S. PATENT DOCUMENTS

| | | | |
|---|---|---|---|
| 4,940,346 A | * | 7/1990 | Lilenquist .................. 400/472 |
| 5,258,909 A | * | 11/1993 | Damerau et al. ............... 704/9 |
| 5,442,373 A | * | 8/1995 | Nomura et al. ............. 345/104 |
| 5,574,447 A | * | 11/1996 | Raylance ..................... 341/22 |
| 5,581,484 A | * | 12/1996 | Prince ..................... 340/407.1 |
| 5,924,059 A | * | 7/1999 | Kawanabe ................... 704/10 |

* cited by examiner

Primary Examiner—John S. Hilten
Assistant Examiner—Xiuqin Sun
(74) Attorney, Agent, or Firm—Michael Schmitt

(57) ABSTRACT

A method for detecting and correcting incorrect hand position of a computer user performing the steps of: a) receiving a word having a plurality of characters from an input device; b) comparing the received word with a plurality of entries contained in a dictionary word list; c) generating a shifted word by shifting at least one of the plurality of characters to a new character if the received word is not found in the dictionary word list; d) comparing the shifted word with the plurality of entries contained in the dictionary word list; e) correcting for the incorrect hand position of the computer user if the shifted word is contained in the dictionary word list; and f) performing again steps C through E if the shifted word is not found in the dictionary word list of step C.

13 Claims, 7 Drawing Sheets

SYSTEM AND METHOD FOR DETECTING AND CORRECTING INCORRECT HAND POSITION OF A COMPUTER USER

BACKGROUND OF THE INVENTION

1. Field of the Invention

The invention relates generally to word processing systems and particularly to a system and method for detecting and correcting incorrect hand position of a computer user.

2. Description of the Related Art

A primary use of computers, especially personal computers, is "word processing." Word processing programs running on personal computers have replaced the typewriter as the principal means for document production. In many office environments, every desk has a personal computer on it. A word processor allows a user to input the text of a document, such as a letter, into a computer and make revisions to it. For example, paragraphs can be easily moved around, misspelled words can be corrected, and words can be added or deleted. In addition, the document can be printed or stored in the computer for subsequent retrieval and updating. There are many such word processors commercially available that provide this functionality.

In producing documents, it is important that each word in a document is spelled correctly. In manual word processing systems (i.e. the typewriter), the only way to check the spelling is to manually review the document after it is typed. In computer word processors, a spell checking program (spell checker) is often used to check the spelling of the words in a document. A spell checker has an associated dictionary file that contains a list of correctly spelled words. To check the spelling of a word in a document, the spell checker searches the dictionary file for that word. If the word is contained in the dictionary file, then the word is determined to be spelled correctly. Otherwise, the word is determined to be misspelled. The spell checker typically reports the misspelling to the user and prompts the user for a corrected spelling. The spell checker can then replace the misspelled word with the correctly spelled word. The typical spell checker also allows the user to add words to the dictionary. For example, the dictionary may not include terms that are used in specialized fields, such as medicine or law.

U.S. Pat. No. 4,797,855 to Duncan IV et al., discloses a Word Processor Having A Spelling Corrector Adaptive To Operator Error Experience. The word processing system has a keyboard, an input display and/or a printer, together with a spelling dictionary stored within a memory, and an error signal generating device activated upon entry of an incorrect word. In addition, the memory of the device stores several kinds of correction information—i.e. typographical correction, transposition reversal (i.e., relating to letters typed out of sequence within a word, such as "teh" when "the" is intended), and phonetic substitutions—suitable for amending the incorrect word to display a trial word which matches one from the above mentioned stored dictionary. The amending occurs by depression of a special key whenever entry of an incorrect word activates the error signal device. When an incorrect word is detected, the reference teaches substituting all of the letters in the word with adjacent characters to either the left or right on the keyboard, which corresponds to laterally shifting both hands either to the left or the right by one character, and comparing the new word with a word in the dictionary. (See Duncan, column 19 lines 53 through column 20 line 29).

On a related topic, traditional keyboards are designed so that one size is applicable for all users. As a result, users with relatively small or large hands must adapt to a keyboard size that is not optimal for their particular hand size. This lack of keyboard size optimization may account for an increase in hand fatigue. In addition, the conventional computer keyboards require the user to type with their hands close together in an unnatural manner. It has been found that so called "split" keyboards, which are split into a separate keyboard for each hand, are more comfortable for the user and produce a slightly faster typing speed as a result. However, such keyboards are generally more expensive and as such have not gained wide spread popularity.

Several attempts have been made to alleviate the problems associated with conventional keyboards. For example, various "virtual keyboards" have been developed. A "virtual keyboard" is generically defined as a typing interface that omits traditional keys and, includes, for example, an apparatus that generates signals which can be interpreted as representing the typing of a key on a keyboard.

U.S. Pat. No. 5,581,484 to Prince discloses a Finger Mounted Computer Input Device. The apparatus provides for manually entering information into a computer wherein a pressure sensor is removably attached proximate to the tip of at least one, but preferably all, of the fingers of a hand for generating a pressure signal that corresponds to the pressure of the fingertip against a surface. A signal relay device, relays the signals of each of the sensors to a computer which calculates the relative positions of each finger on the surface and generates keyboard, mouse, graphics tablet, or other forms of input data

SUMMARY OF THE INVENTION

The Duncan patent referred to above does not disclose a correction that corresponds to a shift of the characters typed by an individual hand to determine whether or not a particular hand was shifted in relationship to the keyboard. In addition, the Prince patent and other virtual keyboards do not provide the ability to initialize and calibrate a virtual keyboard using information obtained from determining whether each one or both of the user's hands are shifted in relationship to the keyboard.

The invention comprises a system and method for detecting and correcting incorrect hand position of a computer user. The method comprises receiving a plurality of characters from an input device and comparing the received characters with a plurality of entries contained in a dictionary word list. If the characters received match an entry in the dictionary word list, it is determined that the characters received correspond to the entry. If the received plurality of characters are not found in the dictionary word list, at least one of the plurality of characters are adjusted by shifting the at least one character in a direction to a new character. The plurality of characters including the at least one shifted character are compared with the plurality of entries contained in the dictionary word list. If the characters as shifted correspond to an entry contained in the dictionary word list, the incorrect hand position of the computer user is corrected based upon the shift in characters. These steps are performed at least one additional time if the shifted word is not found in the dictionary word list.

The step of adjusting at least one of the plurality of characters may comprise the step of shifting the characters typed by at least one hand of the user. The hands may be, for example, the left hand, the right hand or both hands. The characters may be adjusted, for example, by a shift of one or more horizontal character spaces in the left or right direction, thereby corresponding to a horizontal shift of the at least one hand by one or more character spacings. The shift may also be up or down.

Correcting the incorrect hand position of the computer user based upon the shift in characters may include substituting the shifted characters that correspond to an entry contained in the dictionary list for the typed or received characters. In addition, the number of shifts of the at least one character and the direction of the shift(s) may be stored in a memory module and subsequent received characters from the input device may be shifted in accordance with the number of shifts of the at least one character and the direction stored in the memory module.

The number of shifts and direction may also be stored and used to modify a character input device driver to account for the number of shifts of the at least one character in a virtual location of keyboard home keys and to determine subsequent input characters based upon the modified character input device driver.

A system for detecting and correcting incorrect hand position of a computer user, comprises a keyboard that receives a plurality of characters input by a user and a controller. The controller is comprised of memory, a dictionary word list and correction software. The controller interfaces with the keyboard to receive the plurality of characters input by the user. The controller is programmed to perform the following in conjunction with the software and/or separate modules:

i) compare the plurality of characters with entries in the dictionary word list
ii) determine that the received characters correspond to the word entry, if the received characters match an entry in the word list;
iii) adjust at least one of the plurality of characters received by shifting the at least one character in a direction to a new character if the received plurality of characters are not found in the dictionary word list;
iv) compare the plurality of characters including the at least one shifted character with the plurality of entries contained in the dictionary word list; and
v) correct for the incorrect hand position of the computer user if the shifted characters match an entry in the dictionary word list.

BRIEF DESCRIPTION OF THE DRAWINGS

These and other aspects and features of the present invention will become more apparent from the following detailed description considered in connection with the accompanying drawings in which.

DETAILED DESCRIPTION OF THE PREFERRED EMBODIMENTS

Figure 1:
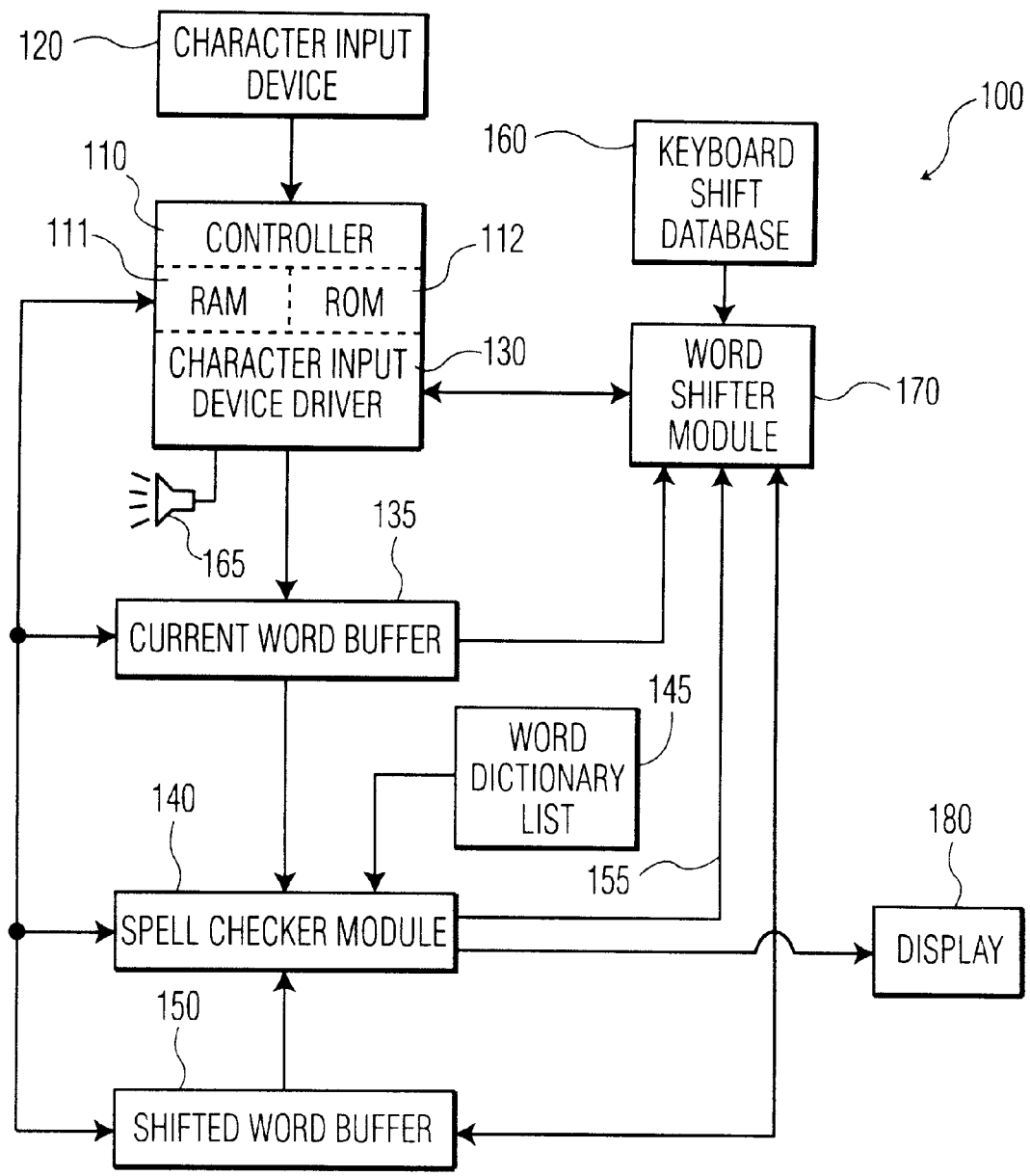
FIG. 1 is a block diagram of a system for detecting and correcting incorrect hand position of a computer user according to the present invention.

Referring now to the drawings, in which similar reference characters denote similar or identical elements throughout the several views, FIG. 1 is a block diagram of a system for detecting and correcting incorrect hand position of a computer user according to an embodiment of the present invention.

System 100 is comprised of a controller 110 having a random access memory (RAM) 111 module, a read only memory (ROM) 112 module and a character input device driver 130. A character input device 120 inputs character signals to controller 110. Device 120 may be either an ordinary keyboard or a device representing a virtual keyboard (not shown). The virtual keyboard may include a glove device having a plurality of sensors disposed at predetermined positions on a user's hand that generate signals which are representative of a finger position in relationship to a keyboard. Once a word is entered into controller 110 by device 120, the word is stored in a current word buffer 135. The current word is then sent to a spell checker module 140 which references a plurality of entries contained in a dictionary word list 145. Spell checker module 140 compares the current word stored in current word buffer 135 with the plurality of entries contained in dictionary word list 145. If the current word is contained in dictionary word list 145, no action is taken as it is determined that the word is correctly spelled. If, however, the current word stored in buffer 135 is not contained in dictionary word list 145, spell checker module 140 displays the incorrect word on a display 180 and sends a signal 155 to a word shifter module 170 indicating the incorrect spelling. Word shifter module 170 receives the current word from current word buffer 135 and signal 155 indicating the misspelled word from spell checker module 140. Word shifter module 170 accesses a keyboard shift database 160 and shifts at least one character contained in current word buffer 135 according to entries contained in keyboard shift database 160. A shifted word is then stored in a shifted word buffer 150. The shifted word contained in word buffer 150 is then sent to spell checker module 140. The shifted word is compared with entries found in dictionary word list 145 as previously disclosed.

Word shifter module 170 uses the entries found in keyboard shift database 160 to modify the current word contained in buffer 135. For example, if the word found in current word buffer 135 is the word (or, more appropriately, the input character sequence) "esyrt", spell checker module 140 would recognize that this word is not found as an entry in dictionary word list 145. Accordingly, word shifter module 170 would receive a signal 155 from module 140 indicating the presence of a misspelled word. Word shifter module 170, acting under the control of a program stored in ROM 112 of controller 110 would access database 160 for the appropriate character substitutions. For example, controller 110 would first direct word shifter module 170 to shift the characters normally typed by the left hand one character to the right. Accordingly, the characters contained in database 160 relating to shifting the left hand one character to the right would shift "w" to "e" and would replace the letter all occurrences of "e" with the character "w", the character "s" with the character "a" and so forth. The character "y", although normally typed with the right hand, would be recognized by database 160 as being one character to the right of "t", which is typed by the left index finger. After the character substitutions have been performed by shifter module 170, the shifted word is then stored in buffer 150. The shifted word is then compared by module 140 with entries found in dictionary word list 145. Based upon the above substitutions, the current word "esyrt" would be replaced with the word "water". The correctly spelled word is then displayed on display 180 for subsequent processing. The user may be alerted that his or her hands are incorrectly positioned. Alternatively, the number of shifts and direction may be stored in RAM 111 and used to adjust the character-input device driver 130 so that subsequent input characters account for the shift in position of the hands. If the word is not recognized by module 140, controller 110 then directs module 170 to shift the characters normally typed by the left hand to the right. If this does not result in a correctly spelled word, the controller can shift characters for either or both hands and also modify the number of characters to shift. Additional checks by controller are possible, such as shifting characters for one or both hands down one character. If the word is still not recognized, controller 110 can notify the user via an audible message over a speaker 165 on a visual message over display 180.

Figure 2A:
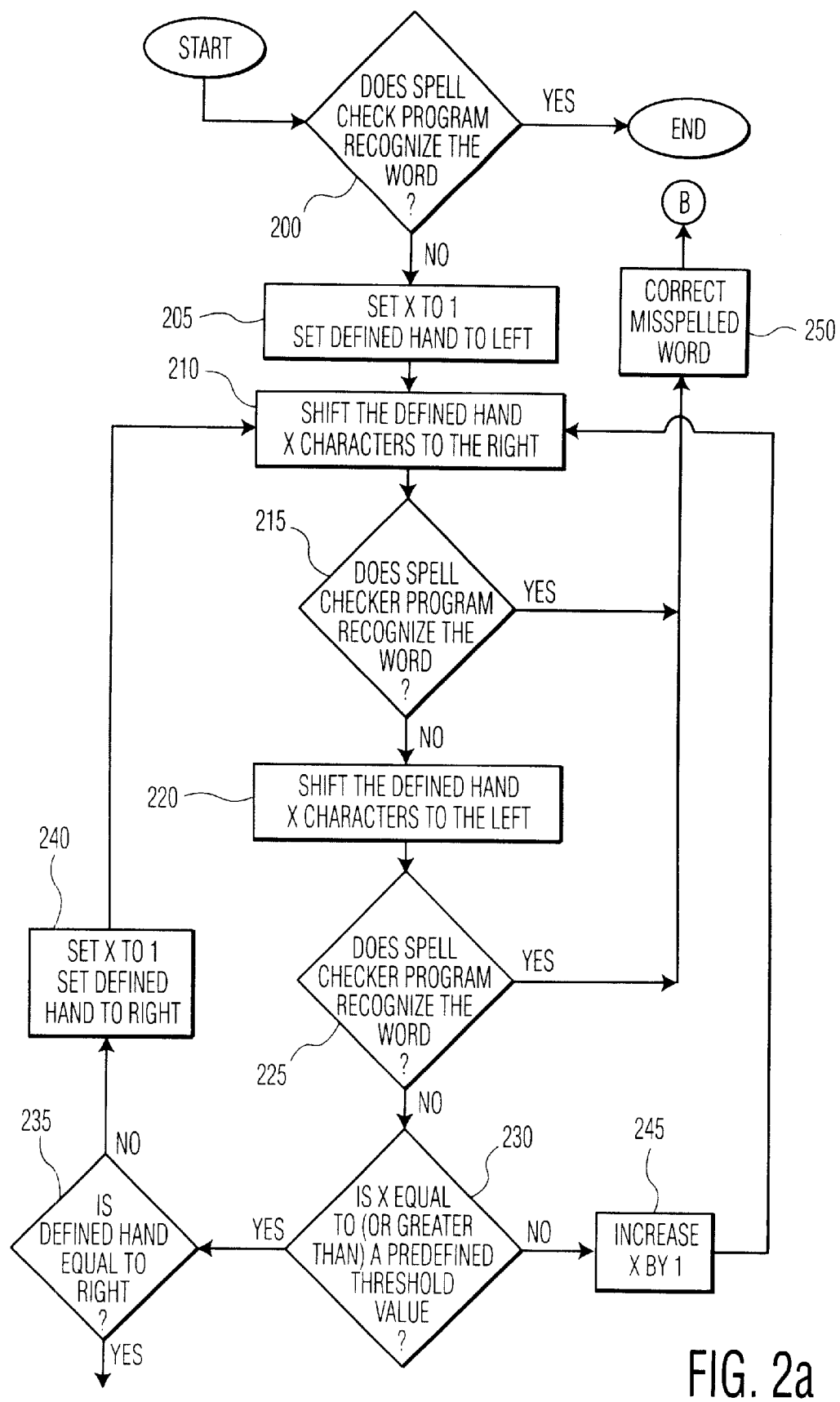
FIGS. 2A–2C are a flow chart illustrating a method for detecting and correcting incorrect hand position of a computer user according to the present invention.

FIG. 2A discloses a flow chart illustrating steps for detecting and correcting incorrect hand position of a computer user according to an embodiment of the present invention. The steps may be those performed, for example, by the components of FIG. 1. Step 200 determines whether or not spell check module 140 recognizes the current word. If so, the process ends since the word is spelled correctly. If spell check module 140 does not recognize the current word stored in current word buffer 135, step 205 sets a variable X to the number 1 and sets a second variable labeled "DEFINED HAND" to LEFT (meaning left hand). The process then proceeds to step 210 wherein word shifter module 170 adjusts the characters such that there is a shift of the DEFINED HAND (the LEFT hand in this example) a total of X characters (1 in this example) to the RIGHT. Step 215 then determines whether or not spell checker module 140 recognizes the shifted word. If so, step 250 corrects the misspelled word and alerts the user that his or her hands are incorrectly positioned, for example, by proceeding to step 295 of FIG. 2c, described below. If not, step 220 adjusts the characters such that there is a shift of the DEFINED HAND a total of X characters to the LEFT. (Each adjustment X is with respect to the normal hand position, i.e. located over the HOME KEYS.) For example, character "s" shifted one character to the RIGHT would yield a character "d" while the character "s" shifted one character to the LEFT would yield a character "a".

If module 140 does not recognize the shifted word in step 225, step 230 determines whether or not the variable X is equal to (or greater than) a predefined threshold value. If not, step 245 increases variable X by one and proceeds to step 210 to repeat the shifting process. If however variable X is equal to (or greater than) a predefined threshold value, step 235 determines whether or not DEFINED HAND is equal to RIGHT. If not, step 240 sets variable X to 1 and sets the DEFINED HAND to RIGHT before proceeding to step 210. The shifting and checking then proceeds in the same manner for the RIGHT HAND until a shifted word is recognized in step 225 or X equals or exceeds the threshold in step 230 for the RIGHT HAND. If equaled or exceeded, then the process returns to step 235, and, because RIGHT HAND is set, continues to step 255 of FIG. 2B.

Figure 2B:
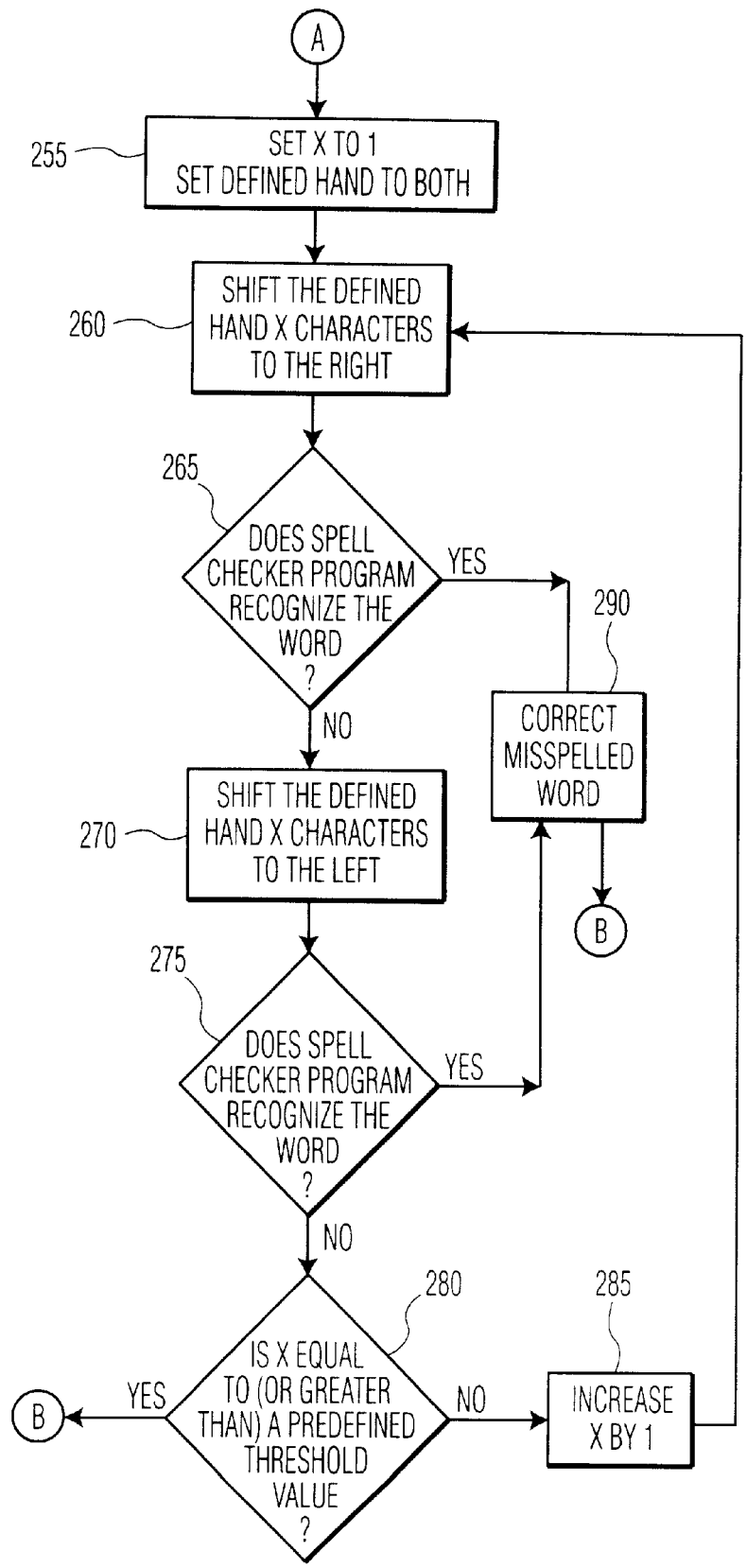

Referring now to FIG. 2B, step 255 sets variable X to 1 and sets DEFINED HAND to BOTH. Continuing, step 260 adjusts the characters such that there is a shift of the DEFINED HAND (BOTH HANDS), each a total of X characters to the RIGHT. Step 265 then determines whether or not the shifted word is recognized by spell checker module 140. If so, step 290 corrects the misspelled word and the process ends. If not, step 270 adjusts the characters such that there is a shift of the DEFINED HAND (BOTH HANDS), each a total of X characters to the LEFT. Step 275 then determines whether or not the shifted word is recognized. If so, the process proceeds to step 290 to correct the misspelled word and alerts the user that his or her hands are incorrectly positioned, for example, by proceeding to step 295 of FIG. 2C, described below. If not, step 280 determines whether the variable X is equal to (or greater than) a predefined threshold value. If not, step 285 increases variable X by 1 and proceeds to step 260 where the above-described process is repeated until a shifted word is recognized in step 265 or X equals or exceeds the threshold in step 280. If equaled or exceeded, the process proceeds to step 295 of FIG. 2C.

Figure 2C:
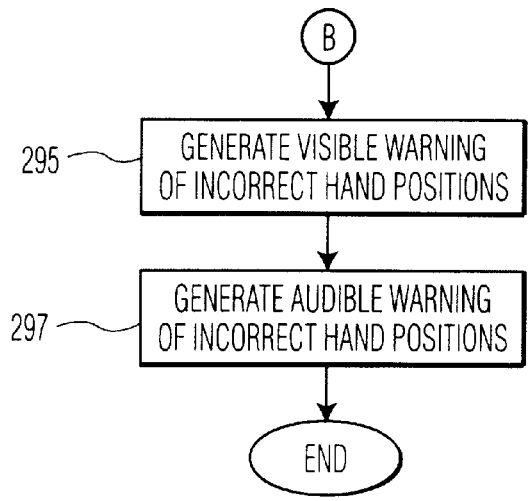

Referring to FIG. 2C, step 295 generates a visible warning indicating a potential presence of incorrect hand positions. The visible warning may be comprised of a message on display 180 indicating the presence of an incorrect word, etc. Step 297 then generates an audible warning of the incorrect hand position. The audible warning may be any suitable sound generated by speaker 165. It is noted that the generation of an audible warning is preferred because often times typing is performed while not looking at what is displayed.

The shifting of a single hand at a time of FIG. 2A and the tandem shifting of both hands in one direction or another of FIG. 2B described above may be supplemented by more complex shifting algorithms. For example, algorithms may be used to detect a misplacement of the left hand by a first number of characters in one direction and the misplacement of the right hand a second number of characters in the same or the other direction.

Thus, for example, the algorithm may first hold the right hand at its initial position while shifting the left hand X characters (X=1, 2, . . . ) to the left and right from its initial position, analogous to steps 205, 210, 215, 220, 225, 230, 245 and 250 in FIG. 2a. If X reaches the predefined threshold value without a match (as in step 230), then the right hand is shifted one character to the left, and the shifting of the left hand X characters to the left and right from its initial position is repeated (i.e., in the manner of steps 205, 210, 215, 220, 225, 230, 245 and 250 in FIG. 2a). The right hand is moved in character increments to the left for each such shifting of the left hand.

If the right hand reaches a maximum number of left shifts without a match, then the shifting of the right hand continues with character increments to the right of its initial position. For each such right shift of the right hand, the left and right shifting of the left hand by X characters up to the predefined threshold value is repeated. At any point there is a match, the processing corrects the misspelled word and alerts the user. If the right hand reaches a maximum number of right shifts without a match, the processing can terminate as in FIG. 2C.

This example of more complex processing identifies and corrects misplacement of the left and right hands by a number of characters that may be different and may also be in different directions.

Figure 3:
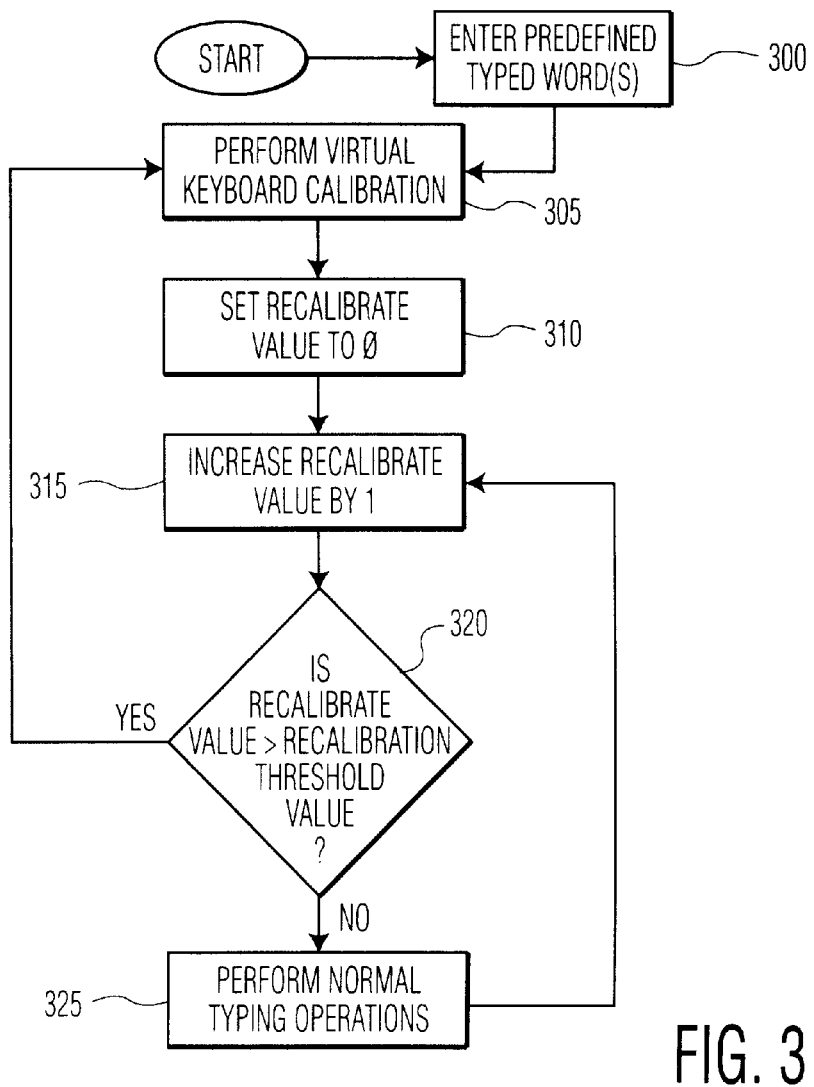
FIG. 3 is a flow chart illustrating a method for calibrating a virtual keyboard according to a preferred embodiment of the present invention.

Referring to FIG. 3, there is shown a flow chart illustrating a method for calibrating a virtual keyboard according to a preferred embodiment of the present invention. Virtual keyboards are typically comprised of a glove or other device having a plurality of sensors disposed at predefined locations on the glove. The sensors generate signals corresponding to the location of individual fingers in relationship to either the other fingers or to the home keys, i.e. ASDF or JKL;, of a keyboard. Since no keyboard actually exists, it is important to establish the location of the home keys in the virtual world and the location of the remaining keys in relationship to the home keys. Accordingly, step 300 prompts the user to enter a predefined list of words or sentences. These words or sentences can be selected so that either a majority of, or all of, the keys represented on the keyboard are entered at least once. Step 305 performs the virtual keyboard calibration, where the sensors are adjusted to correlate to the characters input. Once complete, step 310 sets the recalibration variable value to zero. Step 315then increases the recalibration value by 1. Step 320 determines whether or not the recalibration value is greater than a recalibration threshold value. If so, the process proceeds to step 305 to perform the virtual keyboard calibration. If not, step 325 performs normal typing operations and returns to step 315. It is understood that step 315 may increase the recalibration value by 1 based on several different criteria. For example, the recalibration variable may be increased by 1 for every page typed using the virtual keyboard. In addition, the recalibration value may be increased by 1 after a predetermined number of words have been entered using the virtual keyboard input device.

Figure 4:
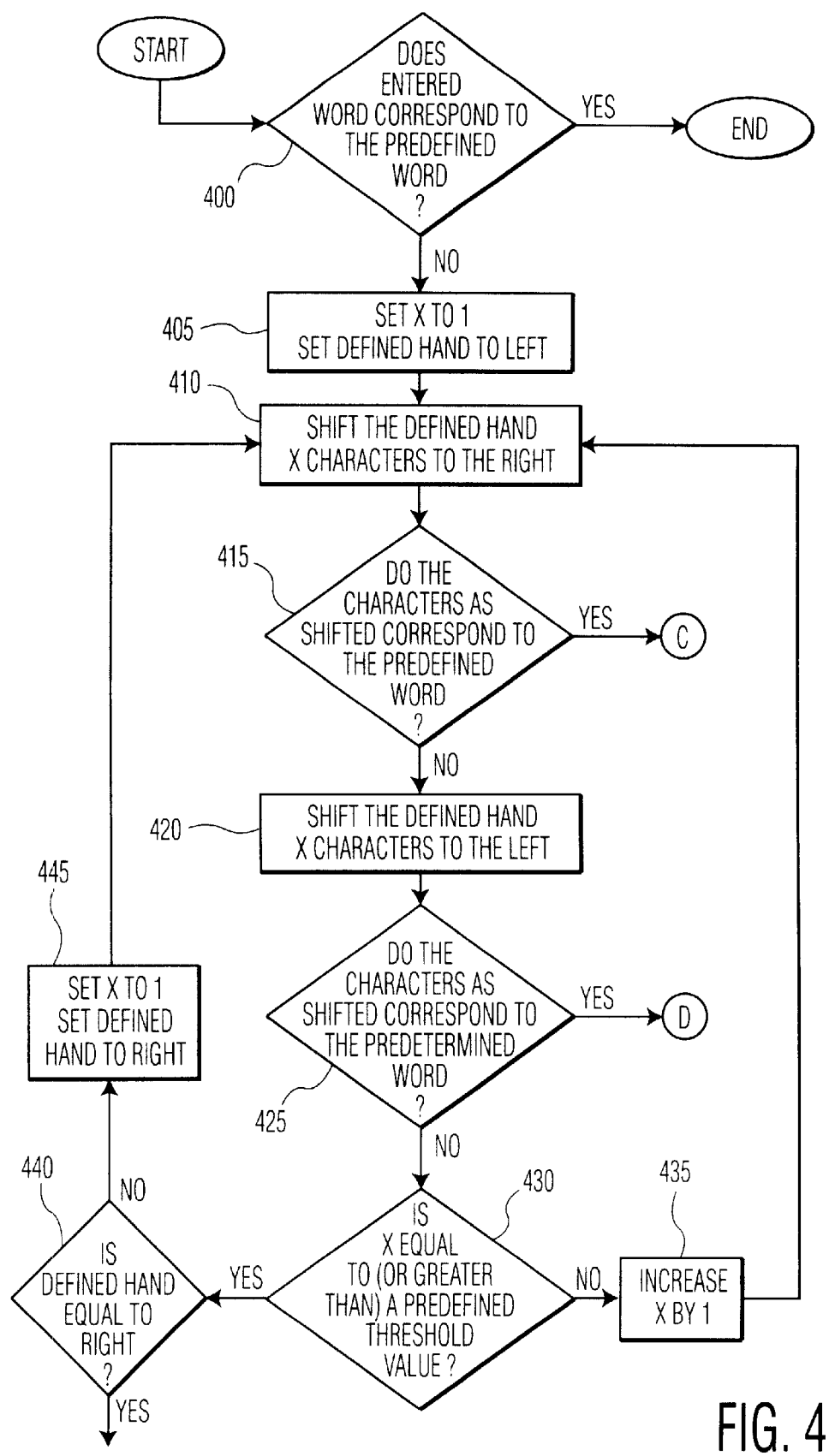
FIGS. 4–7 are a flow chart illustrating the virtual keyboard calibration of step 305 of FIG. 3.

Referring to FIG. 4, there is shown a flow chart for a method of performing the virtual keyboard calibration as shown in step 305 of FIG. 3. Step 400 determines whether or not the entered word corresponds to the predefined word prompted in step 300. If so, the process ends since the word is spelled correctly. If not, step 405 sets variable X to 1 and sets DEFINED HAND to LEFT. Step 410 then adjusts the characters such that there is a shift of the DEFINED HAND (the LEFT hand) a total of X characters to the RIGHT. Step 415 determines whether or not the shifted word corresponds to the predefined word prompted in step 300. If so, the process proceeds to FIG. 6. If not, step 420 adjusts the characters such that there is a shift of the DEFINED HAND a total of X characters to the LEFT and step 425 determines whether or not the shifted word corresponds to the predefined word prompted in step 300. If so, the process proceeds to FIG. 7. If not, step 430 determines whether or not variable X is equal to (or greater than) a predefined threshold value. If not, step 435 increases variable X by 1 and returns to step 410, where the above-described process is repeated until a shifted word corresponds to the predefined word or X equals or exceeds the threshold. If variable X is equal to (or greater than) a predefined threshold value in step 435, the process proceeds to step 440 wherein it is determined whether or not DEFINED HAND is equal to RIGHT. If not, step 445 sets variable X to 1 and sets DEFINED HAND to RIGHT before proceeding back to step 410. Step 410–435 are then repeated for characters corresponding to the RIGHT HAND until a word is recognized in steps 415 or 425 or until X equals or exceeds the threshold in step 430. If equaled or exceeded for the RIGHT HAND, then step 440 results in continuation with step 450.

Figure 5:
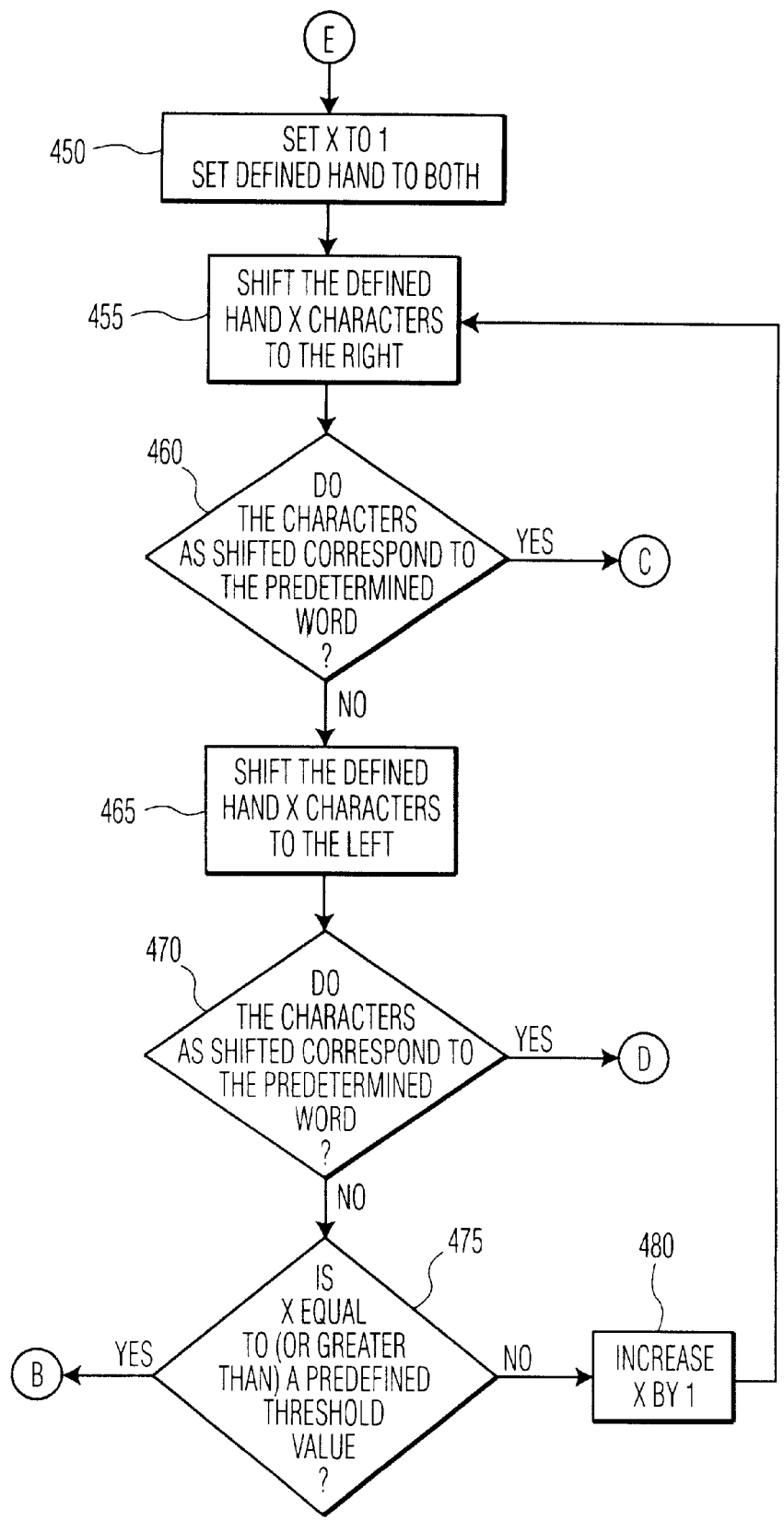

Referring now to FIG. 5, step 450 sets variable X to 1 and sets DEFINED HAND to BOTH. Step 455 then adjusts the characters such that there is a shift of DEFIED HAND (i.e., BOTH HANDS) a total of X characters to the RIGHT. Step 460 determines whether or not the shifted word corresponds to the predefined word prompted in step 300. If so, the process proceeds to FIG. 6. If not, step 465 adjusts the characters such that there is a shift of DEFINED HAM) a total of X characters to the LEFT. Step 470 then determines whether or not the shifted word corresponds to the predefined word prompted in step 300 and proceeds to FIG. 7 if recognized. If so, the process proceeds to FIG. 7. If not, step 475 determines whether variable X is equal to (or greater than) a predefined threshold value. If not, step 480 increases variable X by 1 and then returns to step 455, where the processing continues until a shifted word corresponds to the predetermined word in steps 460 or 470, or X equals or exceeds the threshold. If variable X is equal to (or greater than) a predefined threshold value, the process proceeds to FIG. 2C. The predefined threshold value for variable X may be any whole number greater than or equal to 1. It is understood, however, than shifting either LEFT, RIGHT or BOTH HANDS greater than 4 or 5 characters would yield unintended results as there are only a limited number of keys on the keyboard and shifting too far to one direction would result in nonexistent characters.

Figure 6:
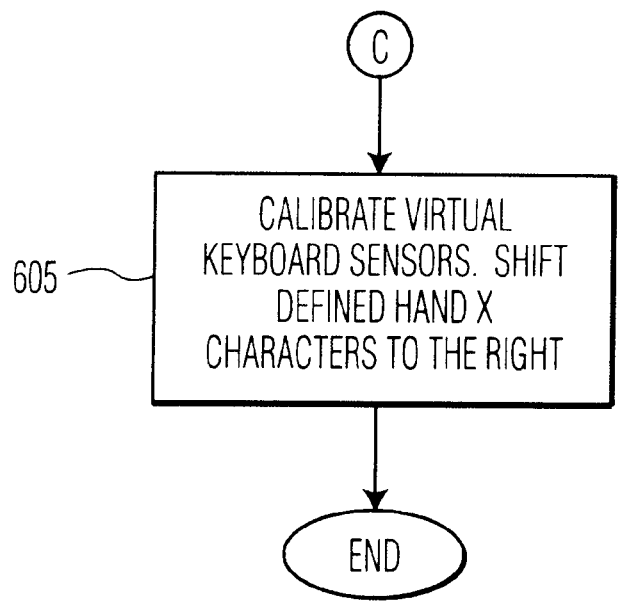

Referring now to FIG. 6, which is carried out if step 460 is satisfied for a value of X, step 605 calibrates the virtual keyboard sensors by adjusting the characters such that there is a shift of DEFINED HAND (i.e., BOTH HANDS) a total of X characters to the RIGHT. This calibration of the virtual keyboard sensors establishes the home keys for subsequent typing. As disclosed in FIG. 3, the process recalibrates periodically when a recalibration value is greater than a recalibration threshold value. Based upon the correction information obtained, subsequent keystrokes from the input device may be shifted by the device driver in a particular direction and by a particular distance, i.e. number of characters, as determined by the present invention. Using the present invention, a computer program can define the location of the virtual home keys and use the information in conjunction with input device data to generate accurate character input data. In addition, periodically re-calibrating the virtual input device also results in accurate character input data. The correction information (distance and direction) is used as an offset with which to determine subsequent character inputs. This may be accomplished by storing the number of character shifts and the direction of the shift in a memory module such as RAM or ROM and shifting subsequent received characters in accordance with the number and direction of the character shift stored in memory.

In addition, the number and direction of the character shifts in relation to the home keys may be used to modify an input device driver so that subsequent input characters will be modified based upon the shift data.

Figure 7:
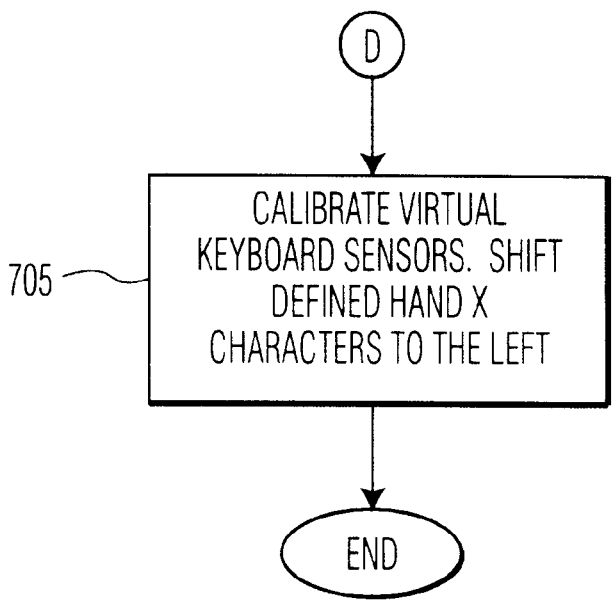

Referring to FIG. 7 which is carried out if step 470 of FIG. 5 is satisfied for a value X, step 705 calibrates the virtual keyboard sensors by adjusting the characters such that there is a shift of the DEFINED HAND (BOTH HANDS) a total of X characters to the LEFT. This shifting data can be stored and used to establish a location of the home keys for the virtual keyboard.

Referring to FIGS. 6 and 7, it is understood that the direction and number of characters necessary to shift the characters to generate the recognized word may be used by computer programs or virtual keyboard input device drivers to yield consistent recognizable keyboard entries.

As in the case of detection and correction of incorrect hand position described above, the step of calibrating (or re-calibrating) the virtual keyboard in step 305 describe in FIGS. 4 and 5 above may be supplemented by more complex algorithms. For example, algorithms may be used to detect a misalignment of the left hand by a first number of characters in one direction and the misalignment of the right hand a second number of characters in the same or the other direction.

Thus, for example, the algorithm may first hold the right hand at its initial position while shifting the left hand X characters (X=1, 2, . . . ) to the left and right from its initial position, analogous to steps 405, 410, 415, 420, 425, 430, and 435 in FIG. 4. If X reaches the predefined threshold value without a match (as in step 430), then the right hand is shifted one character to the left, and the shifting of the left hand X characters to the left and right from its initial position is repeated (i.e., in the manner of steps 405, 410, 415, 420, 425, 430, and 435 in FIG. 4). The right hand is moved in character increments to the left for each such left and right shifting of the left hand.

If the right hand reaches a maximum number of left shifts without a match, then the shifting of the right hand continues with character increments to the right of its initial position. For each such right shift of the right hand, the left and right shifting of the left hand by X characters up to the predefined threshold value is repeated. At any point there is a match, the processing calibrates the virtual keyboard based on the number of characters shifted and the direction of shift for each of the left and right hands. If the right hand reaches a maximum number of right shifts without a match the processing can terminate as in FIG. 2C.

This example of more complex processing thus calibrates the virtual keyboard where there is a misalignment of the left and right hands by a number of characters that may be different and may also be in a different directions.

The following documents are hereby incorporated herein by reference: Copending U.S. patent application Ser. No. 09/107,527 entitled Fingerless Glove For Interacting With Data Processing System, by Vance et al., filed Jun. 30, 1998, and U.S. patent application Ser. No. 09/251,682 entitled Multiple Pressure Sensors Per Finger Of Glove For Virtual Full Typing, by Vance et al., filed Feb. 17, 1999. Both of the aforementioned applications are commonly owned by the assignor of the present invention and provide examples of virtual keyboards.

While several embodiments of the present invention have been shown and described, it is to be understood that many changes and modifications may be made thereto without departing from the spirit and scope of the invention as described in the appended claims.

What is claimed is:

1. A method for detecting and correcting incorrect hand position of a computer user comprising the steps of:
   a) receiving a plurality of characters from an input device;
   b) comparing the received characters with a plurality of entries contained in a word list;
   c) if the characters received match an entry in the word list, determining that the characters received correspond to the word entry;
   d) adjusting at least one of the plurality of characters by shifting the at least one of the characters in a direction to a new character if the received plurality of characters are not found in the dictionary word list;
   e) comparing the plurality of characters including the at least one shifted character with the plurality of entries contained in the word list;
   f) correcting for the incorrect hand position of the computer user using the number of characters shifted if the shifted characters correspond to an entry contained in the word list; and
   g) performing steps d through f at least one additional time if the shifted word is not found in the word list of step f.

2. The method for detecting and correcting incorrect hand position of a computer user according to claim 1 wherein the step of adjusting at least one of the plurality of characters further comprises the step of shifting the characters typed by at least one hand of the user.

3. The method for detecting and correcting incorrect hand position of a computer user according to claim 2 wherein the characters are adjusted by a shift of one horizontal character space thereby corresponding to a horizontal shift of the at least one hand by one character spacing.

4. The method for detecting and correcting incorrect hand position of a computer user according to claim 3 wherein the at least one hand is the left hand and the characters are adjusted to correspond to a shift of the left hand by one character in at least one direction selected from left and right.

5. The method for detecting and correcting incorrect hand position of a computer user according to claim 4, including the additional step of adjusting the characters to correspond to a shift of the right hand by one character in at least one direction selected from left and right prior to repeating steps d through f for the left hand as recited in step g.

6. The method for detecting and correcting incorrect hand position of a computer user according to claim 3 wherein the at least one hand is the right hand and the characters are adjusted to correspond to a shift of the right hand by one character in one direction selected from left and right.

7. The method for detecting and correcting incorrect hand position of a computer user according to claim 6, including the additional step of adjusting the characters to correspond to a shift of the left hand by one character in at least one direction selected from left and right prior to repeating steps d through f for the right hand as recited in step g.

8. The method for detecting and correcting incorrect hand position of a computer user according to claim 3 wherein the at least one hand are both the left and right hands and the characters are adjusted to correspond to a shift by both hands by one character in one direction selected from left and right.

9. The method for detecting and correcting incorrect hand position of a computer user according to claim 1 wherein the step of correcting further comprises the steps of substituting the shifted characters corresponding to an entry contained in the list for the received characters and displaying the shifted characters as the corrected word on a display.

10. The method for detecting and correcting incorrect hand position of a computer user according to claim 1 wherein the step of correcting further comprises the steps of:
   storing the number of shifts of the at least one character and the direction in a memory module;
   shifting subsequent received characters from the input device in accordance with the number of shifts of the at least one character and the direction stored in the memory module.

11. The method for detecting and correcting incorrect hand position of a computer user according to claim 1 wherein the step of correcting further includes the steps of:
   storing the number of shifts of the at least one character and the direction in a memory module;
   modifying a character input device driver to account for the number of shifts of the at least one character in a virtual location of keyboard home keys; and
   determining subsequent input characters based upon the modified character input device driver.

12. A system for detecting and correcting incorrect hand position of a computer user, the system comprising:
   a) a keyboard that receives a plurality of characters input by a user;
   b) a controller, the controller comprised of memory, a word list and correction software, the controller interfacing with the keyboard to receive the plurality of characters input by the user, the controller:

i) comparing the plurality of characters with entries in the word list ii) determining that the received characters correspond to the word entry, if the received characters match an entry in the word list;

iii) adjusting at least one of the plurality of characters received by shifting the at least one character in a direction to a new character if the received plurality of characters are not found in the word list;

iv) comparing the plurality of characters including the at least one shifted character with the plurality of entries contained in the word list; and v) correcting for the incorrect hand position of the computer user if the shifted characters match an entry in the word list.

13. A method for detecting an incorrect hand position on a virtual location of keyboard home keys and calibrating a correct hand position comprising the steps of:

a) receiving a plurality of characters from an input device that interfaces with a user's hands;

b) comparing the received characters with at least one predefined word;

c) if the characters received match the at least one predefined word, determining that the hands are in the correct hand position;

d) adjusting at least one of the plurality of characters by shifting the at least one of the characters in a direction to a new character if the received plurality of characters do not match the at least one predefined word;

e) comparing the plurality of characters including the at least one shifted character with the at least one predefined word;

f) if the shifted characters match the at least one predefined word, modifying a character driver of the input device to account for the number of shifts of the at least one character in the virtual location of keyboard home keys; and g) performing steps D through F at least one additional time if the shifted word does not match the at least one predefined word.

* * * * *